United States Patent
Emerson et al.

(10) Patent No.: US 7,039,756 B2
(45) Date of Patent: May 2, 2006

(54) METHOD FOR USE OF TERNARY CAM TO IMPLEMENT SOFTWARE PROGRAMMABLE CACHE POLICIES

(75) Inventors: Steven M. Emerson, Chanhassen, MN (US); Balraj Singh, Morgan Hill, CA (US)

(73) Assignee: LSI Logic Corporation, Milpitas, CA (US)

( * ) Notice: Subject to any disclaimer, the term of this patent is extended or adjusted under 35 U.S.C. 154(b) by 391 days.

(21) Appl. No.: 10/424,236

(22) Filed: Apr. 28, 2003

(65) Prior Publication Data

US 2004/0215893 A1     Oct. 28, 2004

(51) Int. Cl.
 *G06F 12/00* (2006.01)
(52) U.S. Cl. ..................................................... 711/108
(58) Field of Classification Search ................ 711/108, 711/118
 See application file for complete search history.

(56) References Cited

U.S. PATENT DOCUMENTS

| | | | | |
|---|---|---|---|---|
| 4,860,192 A | * | 8/1989 | Sachs et al. ................... | 711/3 |
| 5,263,140 A | * | 11/1993 | Riordan ....................... | 711/207 |
| 5,615,349 A | * | 3/1997 | Matsuo et al. ............... | 712/212 |
| 5,710,905 A | * | 1/1998 | Wan ............................ | 711/118 |
| 5,724,549 A | * | 3/1998 | Selgas et al. ................ | 711/141 |
| 5,913,228 A | * | 6/1999 | Bedarida ..................... | 711/170 |
| 6,373,846 B1 | | 4/2002 | Daniel et al. | |

OTHER PUBLICATIONS

"AMBA™ Specification", (Rev. 2.0), ARM Limited 1999, pp. 1-1 through 6-38 (230 pages).

* cited by examiner

*Primary Examiner*—Matthew D. Anderson
(74) *Attorney, Agent, or Firm*—Christopher P. Maiorana, P.C.

(57) ABSTRACT

A method of operating a circuit is disclosed. The method generally comprises the steps of (A) generating a particular policy of a plurality of policies by a lookup operation on a first transaction request received by the circuit, (B) generating a second transaction request for use by a memory external to the circuit based upon the first transaction request and the particular policy in response to a first cache signal of the first transaction request having a non-cacheable state and (C) searching a plurality of address tags for cache data cached within the circuit for a match with the first transaction request in response to the first cache signal having a cacheable state.

21 Claims, 9 Drawing Sheets

TABLE II

| CAM ADDR | CAM CONTENTS ||| EFFECTIVE ADDRESS RANGE | CACHE POLICIES IN EFFECT |
|---|---|---|---|---|---|
| | CAM ENTRY | CAM MASK | CAM OUTPUT (POLICY BITS) | | |
| 0x0 | 30'h3FFF_0000 | 30'hFFFF_0000 | 5'b00000 | 30'h3FFF_0000-<br>30'h3FFF_FFFF | NON-CACHEABLE |
| 0x1 | 30'h4FFF_0000 | 30'hFFFF_F000 | 5'b00011 | 30'h4FFF_0000-<br>30'h4FFF_0FFF | CACHEABLE, BUFFERABLE, WRITE-THRU,<br>NO-WRITE-ALLOCATE |
| 0x2 | 30'h5FFF_0000 | 30'hFFFF_F000 | 5'b11011 | 30'h5FFF_0000-<br>30'h5FFF_0FFF | CACHEABLE, BUFFERABLE, WRITE-THRU,<br>WRITE-ALLOCATE, ALLOCATE ON BURST |
| 0x3 | 30'h6FFF_0000 | 30'hFFFF_FF00 | 5'b00000 | 30'h6FFF_0000-<br>30'h6FFF_00FF | NON-CACHEABLE |
| 0x4 | 30'h7FFF_0000 | 30'hFFF0_0000 | 5'b00011 | 30'h7FFF_0000-<br>30'h7FFF_FFFF | CACHEABLE, BUFFERABLE, WRITE-THRU,<br>NO-WRITE-ALLOCATE |
| 0x5 | 30'h8FE6_0000 | 30'hFFF0_0000 | 5'b00111 | 30'h8FE0_0000-<br>30'h8FEF_FFFF | CACHEABLE, BUFFERABLE, WRITE-THRU,<br>NO-WRITE-ALLOCATE |

FIG. 5

TABLE III

| ADDRESS (HEX) | REGISTER NAME | RD/WR | RESET STATE | NOTES |
|---|---|---|---|---|
| PERIPH_BASE + 0 | CACHE CONFIGURATION | - | - | |
| PERIPH_BASE + 4 | CACHE MODE | - | - | |
| | RESERVED | | | |
| PERIPH_BASE + 20 | SCRATCHPAD 0 BASE | - | - | |
| PERIPH_BASE + 24 | SCRATCHPAD 1 BASE | - | - | |
| PERIPH_BASE + 28 | SCRATCHPAD 2 BASE | - | - | |
| PERIPH_BASE + 2C | SCRATCHPAD 3 BASE | - | - | |
| | RESERVED | | | |
| PERIPH_BASE + 40 | MAINTENANCE BUS PAGE ADDRESS | - | - | |
| PERIPH_BASE + 4C | MAINTENANCE BUS PAGE ADDRESS MASK | - | - | |
| | RESERVED | | | |
| PERIPH_BASE + 100 | CACHE POLICY PAGE ADDRESS 0 | - | - | POLICY CAM ENTRY FIELD |
| PERIPH_BASE + 104 | CACHE POLICY PAGE ADDRESS 1 | - | - | POLICY CAM ENTRY FIELD |
| PERIPH_BASE + 108 | CACHE POLICY PAGE ADDRESS 2 | - | - | POLICY CAM ENTRY FIELD |
| PERIPH_BASE + 10C | CACHE POLICY PAGE ADDRESS 3 | - | - | POLICY CAM ENTRY FIELD |
| PERIPH_BASE + 110 | CACHE POLICY PAGE ADDRESS 4 | - | - | POLICY CAM ENTRY FIELD |
| PERIPH_BASE + 114 | CACHE POLICY PAGE ADDRESS 5 | - | - | POLICY CAM ENTRY FIELD |
| PERIPH_BASE + 118 | CACHE POLICY PAGE ADDRESS 6 | - | - | POLICY CAM ENTRY FIELD |
| PERIPH_BASE + 11C | CACHE POLICY PAGE ADDRESS 7 | - | - | POLICY CAM ENTRY FIELD |

FIG. 6a

TABLE III (CONTINUED)

| | | | |
|---|---|---|---|
| PERIPH_BASE + 120 | CACHE POLICY PAGE ADDRESS 8 | - | POLICY CAM ENTRY FIELD |
| PERIPH_BASE + 124 | CACHE POLICY PAGE ADDRESS 9 | - | POLICY CAM ENTRY FIELD |
| PERIPH_BASE + 128 | CACHE POLICY PAGE ADDRESS 10 | - | POLICY CAM ENTRY FIELD |
| PERIPH_BASE + 12C | CACHE POLICY PAGE ADDRESS 11 | - | POLICY CAM ENTRY FIELD |
| PERIPH_BASE + 130 | CACHE POLICY PAGE ADDRESS 12 | - | POLICY CAM ENTRY FIELD |
| PERIPH_BASE + 134 | CACHE POLICY PAGE ADDRESS 13 | - | POLICY CAM ENTRY FIELD |
| PERIPH_BASE + 138 | CACHE POLICY PAGE ADDRESS 14 | - | POLICY CAM ENTRY FIELD |
| PERIPH_BASE + 13C | CACHE POLICY PAGE ADDRESS 15 | - | POLICY CAM ENTRY FIELD |
| | RESERVED | | |
| PERIPH_BASE + 200 | CACHE POLICY PAGE ADDRESS MASK 0 | - | POLICY CAM ENTRY FIELD |
| PERIPH_BASE + 204 | CACHE POLICY PAGE ADDRESS MASK 1 | - | POLICY CAM ENTRY FIELD |
| PERIPH_BASE + 208 | CACHE POLICY PAGE ADDRESS MASK 2 | - | POLICY CAM ENTRY FIELD |
| PERIPH_BASE + 20C | CACHE POLICY PAGE ADDRESS MASK 3 | - | POLICY CAM ENTRY FIELD |
| PERIPH_BASE + 210 | CACHE POLICY PAGE ADDRESS MASK 4 | - | POLICY CAM ENTRY FIELD |
| PERIPH_BASE + 214 | CACHE POLICY PAGE ADDRESS MASK 5 | - | POLICY CAM ENTRY FIELD |
| PERIPH_BASE + 218 | CACHE POLICY PAGE ADDRESS MASK 6 | - | POLICY CAM ENTRY FIELD |
| PERIPH_BASE + 21C | CACHE POLICY PAGE ADDRESS MASK 7 | - | POLICY CAM ENTRY FIELD |
| PERIPH_BASE + 220 | CACHE POLICY PAGE ADDRESS MASK 8 | - | POLICY CAM ENTRY FIELD |
| PERIPH_BASE + 224 | CACHE POLICY PAGE ADDRESS MASK 9 | - | POLICY CAM ENTRY FIELD |
| PERIPH_BASE + 228 | CACHE POLICY PAGE ADDRESS MASK 10 | - | POLICY CAM ENTRY FIELD |
| PERIPH_BASE + 22C | CACHE POLICY PAGE ADDRESS MASK 11 | - | POLICY CAM ENTRY FIELD |
| PERIPH_BASE + 230 | CACHE POLICY PAGE ADDRESS MASK 12 | - | POLICY CAM ENTRY FIELD |
| PERIPH_BASE + 234 | CACHE POLICY PAGE ADDRESS MASK 13 | - | POLICY CAM ENTRY FIELD |
| PERIPH_BASE + 238 | CACHE POLICY PAGE ADDRESS MASK 14 | - | POLICY CAM ENTRY FIELD |
| PERIPH_BASE + 23C | CACHE POLICY PAGE ADDRESS MASK 15 | - | POLICY CAM ENTRY FIELD |
| | RESERVED | | |
| PERIPH_BASE + 300 | CACHE POLICY 0 | - | POLICY CAM ENTRY FIELD |

FIG. 6b

TABLE III (CONTINUED)

| | | | |
|---|---|---|---|
| PERIPH_BASE + 304 | CACHE POLICY 1 | - | POLICY CAM ENTRY FIELD |
| PERIPH_BASE + 308 | CACHE POLICY 2 | - | POLICY CAM ENTRY FIELD |
| PERIPH_BASE + 30C | CACHE POLICY 3 | - | POLICY CAM ENTRY FIELD |
| PERIPH_BASE + 310 | CACHE POLICY 4 | - | POLICY CAM ENTRY FIELD |
| PERIPH_BASE + 314 | CACHE POLICY 5 | - | POLICY CAM ENTRY FIELD |
| PERIPH_BASE + 318 | CACHE POLICY 6 | - | POLICY CAM ENTRY FIELD |
| PERIPH_BASE + 31C | CACHE POLICY 7 | - | POLICY CAM ENTRY FIELD |
| PERIPH_BASE + 320 | CACHE POLICY 8 | - | POLICY CAM ENTRY FIELD |
| PERIPH_BASE + 324 | CACHE POLICY 9 | - | POLICY CAM ENTRY FIELD |
| PERIPH_BASE + 328 | CACHE POLICY 10 | - | POLICY CAM ENTRY FIELD |
| PERIPH_BASE + 32C | CACHE POLICY 11 | - | POLICY CAM ENTRY FIELD |
| PERIPH_BASE + 330 | CACHE POLICY 12 | - | POLICY CAM ENTRY FIELD |
| PERIPH_BASE + 334 | CACHE POLICY 13 | - | POLICY CAM ENTRY FIELD |
| PERIPH_BASE + 338 | CACHE POLICY 14 | - | POLICY CAM ENTRY FIELD |
| PERIPH_BASE + 33C | CACHE POLICY 15 | - | POLICY CAM ENTRY FIELD |
| | RESERVED | | |
| PERIPH_BASE + 400 | LINE LOCK | | |
| PERIPH_BASE + 404 | INVALID LINE | | |
| PERIPH_BASE + 408 | ALLOCATE LINE | | |
| PERIPH_BASE + 40C | CACHE FLUSH | | |
| | RESERVED | | |

FIG. 6c

|  31:2 |  1:0 |
| --- | --- |
| PA | RESERVED |

FIG. 7

|  31:2 |  1:0 |
| --- | --- |
| PM | RESERVED |

FIG. 8

|  31:5 | 4 | 3 | 2 | 1 | 0 |
| --- | --- | --- | --- | --- | --- |
| RESERVED | MWA | WB | WA | B | C |

FIG. 9

METHOD FOR USE OF TERNARY CAM TO IMPLEMENT SOFTWARE PROGRAMMABLE CACHE POLICIES

CROSS REFERENCE TO RELATED APPLICATIONS

The present application relates to co-pending applications (i) Ser. No. 10/262,180 filed Oct. 1, 2002, now U.S. Pat. No. 6,799,304, (ii) Ser. No. 10/323,521 filed Dec. 18, 2002 and (iii) Ser. No. 10/325,383 filed Dec. 20, 2002 which are hereby incorporated by reference in their entirety.

FIELD OF THE INVENTION

The present invention relates to caching policies generally and, more particularly, to a method for using a ternary content addressable memory to implement software programmable cache policies.

BACKGROUND OF THE INVENTION

Conventional cache policies have been implemented in a number of different ways such as hard-coded as part of a design, adjustable via configuration pins and adjustable via memory protection or memory management units for tightly coupled caches. A tightly coupled cache is commonly directly connected to a central processor unit (CPU) and does not have a bus protocol implemented in a data path between the CPU and the cache. In the absence of a bus protocol, the cache policy to be used can be easily communicated to the cache controller as a direct output from a memory protection circuit or a memory management unit for the CPU.

If cache policies are hard-coded (i.e., fixed in the cache hardware), the cache policies can be too restrictive to be of use to a system programmer. Poor system performance or even incorrect operation can result from hard-coded policies. Configuration pins typically are used to define a limited set of options and are not normally used to define the cache policies by address region. Some existing processors define large blocks of fixed-size memory regions with a particular set of cache policies to be used for each block, but the granularity of the address regions or the cache policies are not always sufficiently flexible.

SUMMARY OF THE INVENTION

The present invention concerns a method of operating a circuit. The method generally comprises the steps of (A) generating a particular policy of a plurality of policies by a lookup operation on a first transaction request received by the circuit, (B) generating a second transaction request for use by a memory external to the circuit based upon the first transaction request and the particular policy in response to a first cache signal of the first transaction request having a non-cacheable state and (C) searching a plurality of address tags for cache data cached within the circuit for a match with the first transaction request in response to the first cache signal having a cacheable state.

The objects, features and advantages of the present invention include providing a method and/or architecture for software programmable cache policies that may provide (i) a flexible method to determine cache policies for de-coupled caches, (ii) a cache policy determination that may be done dynamically using an address region match, (iii) variable size address pages, (iv) use of bus based cache where the bus may provide limited support for a cache policy determination and/or (v) a multi-ported cache where individual input ports coming into the cache may have different bus protocol types without conflicting cache policy determination support.

BRIEF DESCRIPTION OF THE DRAWINGS

These and other objects, features and advantages of the present invention will be apparent from the following detailed description and the appended claims and drawings in which:

FIG. 5 is a table for an example of a policy CAM operation;

FIGS. 6a–c are a table summarizing a peripheral register set;

FIG. 7 is a diagram of a Cache Policy Page Address register bit definition;

FIG. 8 is a diagram of a Cache Policy Page Mask register bit definition; and

FIG. 9 is a diagram of a Cache Policy register bit definition.

DETAILED DESCRIPTION OF THE PREFERRED EMBODIMENTS

The present invention generally concerns a software programmable method and architecture for specifying cache policies by memory region (e.g., address range). Specific cache policies may be implemented such that a bus protocol between a processor and a bus-based cache module has no or little impact on cache policy determination. Each of the memory regions may be variable in size and a number of regions that may be supported may be determined by a size of a content addressable memory (CAM). A policy is generally determined for every cacheable type transaction request by using an address generated by a processor to retrieve a particular policy to be implemented for that transaction request using CAM lookup methods. In one embodiment, a ternary CAM implementation may determine the cache policy which may be enforced for a particular memory address region.

Figure 1:
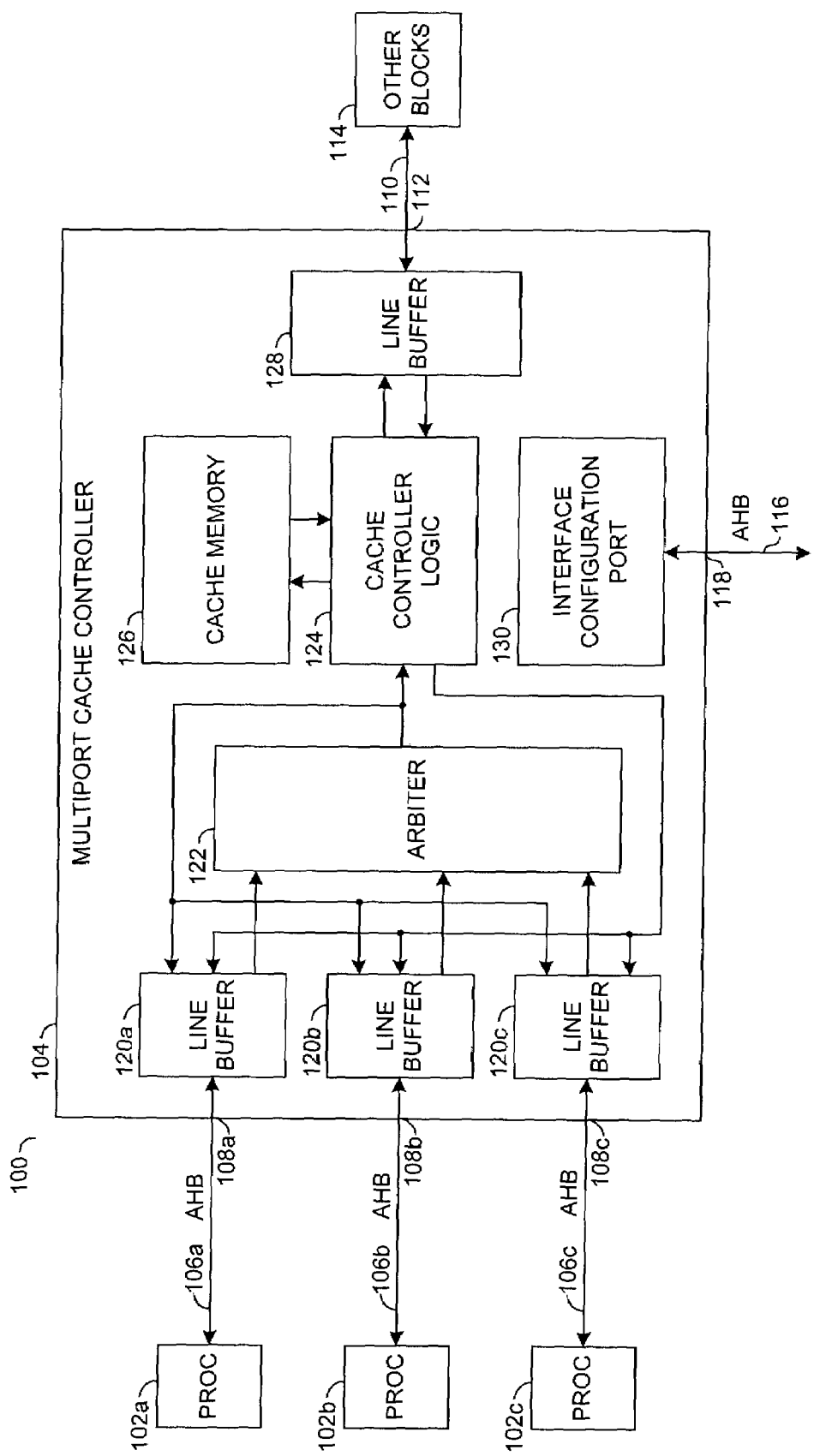
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system 100 generally comprises one or more circuits or blocks 102a–c each coupled to a circuit or block 104 with a bus 106a–c at bus interfaces or ports 108a–c. Another bus 110 may couple the block 104 at a bus interface or port 112 to other circuits or blocks generally designated as 114. A third bus 116 may be coupled to the block 104 at a bus interface or port 118.

The block 104 may be used with multiple processors 102a–c or with a mix of processors 102a–c and other master devices (e.g., hardware masters and software masters). The block 104 generally provides an inline cache subsystem or module to improve system latency for high performance processors 102a–c. A variety of system topologies may exist which could benefit from the block 104.

The block 104 may be implemented as an inline level 1 or level 2 (L2) cache circuit also referred to as a multiport cache block. The multiport cache block 104 is generally designed to support a wide range of cache policies. The support of the cache policy options or parameters may be implemented in a variety of ways depending on the options to be supported. The options may be supported using the following methods, software programmable based upon an address rage of transaction requests or commands, software programmable base on a mode, compile-time switches and/or strap pins.

Each bus 106a–c, 110 and 116 may be implemented as an Advanced High-Performance Bus (AHB) defined in an "Advanced Microcontroller Bus Architecture (AMBA) Specification", revision 2.0, 1999, published by ARM Limited, Cambridge, England and hereby incorporated by reference in its entirety. Each bus may be implemented with a different native width and/or a different subset of protocols to accommodate different types of processors 102a–c, port widths, endianess, and/or clock frequencies. Other bus standards may be implemented to meet a design criteria of a particular application.

The configurable multiport cache block 104 may be operational as a fully featured cache controller with multiple on-chip AMBA AHB ports 108a–c, 112 and 118. The multiport cache block 104 generally supports from one to eight ports 108a–c using a compile time parameter. In addition, a wide variety of cache controller configurations and cache policies may be supported via software, compile-time options and strap pins.

An example range of configuration options may include, but are not limited to, associativity (e.g., 4, 8, 16-way), set size (e.g. 16 kilobytes (KB) to 64 KB), write back versus write-through, write allocate/no-write-allocate, line widths (e.g., 256/512-bit lines), line replacement policy (e.g., modified line replacement unit (LRU) or random), cacheability via an AHB signal (e.g., HPROT), bufferability via the signal HPROT, cache flush and/or cache enable. The multiport cache block 104 may also provide parity protection with an option for error correction coding, fully synchronous operation, fully static operation, flexible AHB bus 108a–c, 110 and 116 clocking that may allow for synchronous but integer related clock frequencies, configurable line sizes, cache coherency checks and/or changeable cache policies. The cacheability and bufferability of the multiport cache block 104 may be determined by AHB signal HPROT bits which may driven by the processors 102a–c and other masters (not shown). Fully featured processors 102a–c will generally have an memory management unit or other memory protection blocks that may define the cacheability and bufferability attributes.

Address ranges from transaction requests received by the multiport cache block 104 may be used to control some cache policies, including write-back versus write through and write allocate/no-write-allocate. The address ranges for each particular policy may be programmed ahead of time via the interface configuration block 130. Once programmed, an address compare may be performed in parallel and substantially simultaneously or contemporaneously with a tag lookup operation to determine an appropriate cache policy to implement. Having multiple different cache policies across an address space may provide several benefits. For example, software programmers may have control over code location during object linking compilation step. Data that may behave better in an L2 cache using a write-back policy may be located accordingly and be controlled in the L2 cache by programming the address range registers appropriately. Instruction code may be located outside the address ranges of the customized policies and thus may adhere to a background policy that may also be programmed by software. Two address ranges and thus two different policies may overlap each other. Priority may be given to the policy associated with the address range having the most number of bits matching an address in the transaction request being considered.

Several line replacement options may be supported using programmable mode bits within cache control registers. The line replacement policy for the entire cache may be determined by a mode setting in the cache control registers. The policy may be uniform across the cache and should not be changed after startup. The line replacement policies supported may include, but are not limited to, modified-LRU replacement and random replacement. The cache mode may be changed after the cache has been flushed and before re-enabled.

The multiport cache block 104 generally supports a number of associativity options as well as set size per way using both compile-time as well as strap pin (not shown) options. Therefore, a user may integrate a range of associativity and set size options and make the options adjustable using strap pins. Once the behavior of the application under various associativity and set size options is generally understood, the user may either recompile a specific option or set of options to save silicon area. Alternatively, for re-programmable systems, the user may continue to support a range of options. For multiple processors 102a–c and/or multiple software threads, the increased associativity generally helps increase overall cache effectiveness with a tradeoff as to total cache size. The range of associativity supported may be 4, 8 or 16-way with set sizes of 16 KB, 32 KB or 64 KB per set. The ranges generally result in a total supportable cache size of 64 KB to 1 megabytes. Other ranges of associativity and set sizes may be implemented to meet the criteria of a particular application. The options may be summarized in Table I as follows:

TABLE I

| Associativity (N-Way) | Set Size (KB) | Total Cache Size (KB) |
|---|---|---|
| 4-way | 16 | 64 |
|  | 32 | 128 |
|  | 64 | 256 |
| 8-way | 16 | 128 |
|  | 32 | 256 |
|  | 64 | 512 |
| 16-way | 16 | 256 |
|  | 32 | 512 |
|  | 64 | 1024 |

The multiport cache block 104 generally comprises a plurality of line buffer circuits or blocks 120a–c, an arbiter circuit or block 122, a cache controller circuit or block 124, a cache memory circuit or block 126, a line buffer circuit or block 128 and an interface configuration circuit or block 130. Each line buffer block 120a–c may be connected to one of the busses 106a–c, respectively. Further details for the line buffer block 120a–c may be found in the related application Ser. No. 10/323,521 entitled, "AMBA Slave Modular Bus Interfaces".

The arbiter block 122 may be operational to control access to the controller block 124 through the line buffer blocks 120a–c. The arbiter block 122 generally performs a prioritization and ordering of AHB Line Cache requests for the cache controller block 124. The arbitration process may be both a fixed and Time Division Multiplexor (TDM) based scheme with lookahead that may help to allocate priority appropriately while preventing a port from starving other ports. Both the programming of the arbitration scheme and TDM slot assignments is generally done under program control through the interface configuration block 130. The lookahead feature may ensure assigned timeslots do not go unused. Further details for the arbiter block 122 may be found in the related application Ser. No. 10/262,180 entitled, "Arbitration Within a Multiport AMBA Slave". The arbiter block 122 may provide exclusive access among the line buffer blocks 120*a–c* to the controller block 124 through a multiplexer (not shown) at any given time.

The controller block 124 may be operational to control cache operations within the multiport cache block 104. The controller block 124 may also be operational to control cache policies of transaction requests held in the line buffer blocks 120*a–c* based on one or more address ranges associated with the policies. Details for the controller block 124 will be provided later.

The cache memory block 126 may be configured to store address tags, cache data and the cache policies. The cache memory block 126 is generally controlled by the controller block 124. Details for the cache memory block 126 will be provided below.

The interface configuration block 130 may be operational to program and configure the other blocks within the multiport cache block 104. The interface configuration block 130 may be used to setup the programmable cache policies in the cache memory block 126 and read the programmed polices from the cache memory block 126. In one embodiment, the interface configuration block 130 may be implemented as a 32-bit AHB-Lite port that generally allows access to control and status registers for each of the major sub-blocks of the multiport cache block 104. The interface configuration block 130 may be connected to one of the same AHB busses 106*a–c* as the line buffer blocks 120*a–c* but is generally independent of the line buffer blocks 120*a–c* to enable high performance by reducing address decoding and data multiplexing. Further details of the interface configuration block 130 may be found in the related application Ser. No. 10/323,521 entitled, "AMBA Slave Modular Bus Interfaces".

Figure 2:
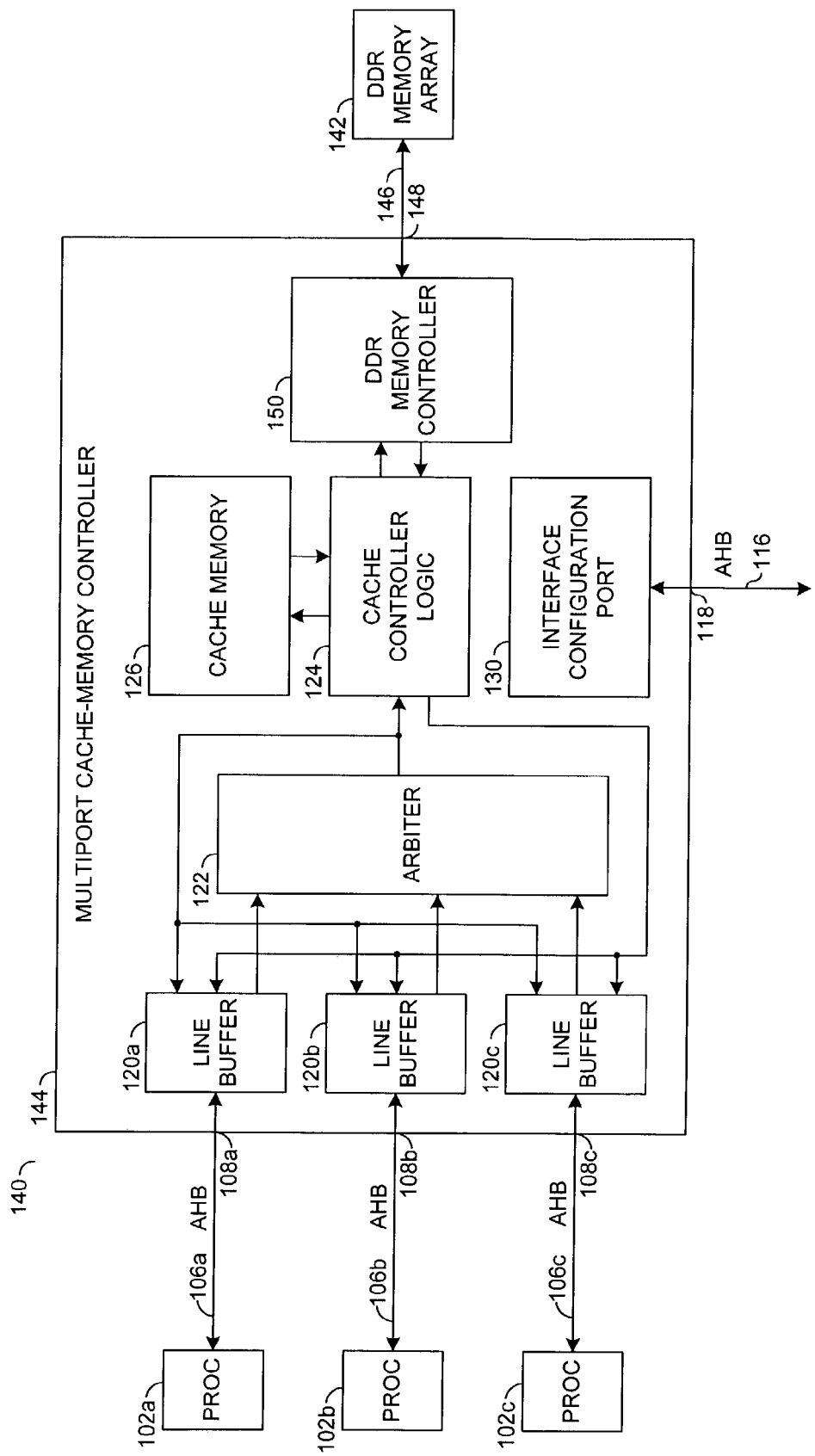
FIG. 2 is a block diagram of an example implementation of another system.

Referring to FIG. 2, a block diagram of an example implementation of a system 140 is shown. The system 140 generally comprises the processors 102*a–c*, the busses 106*a–c* and 116, a circuit or block 142, a circuit or block 144, and a link 146 connecting the block 142 to the block 144 at an interface 148. The block 144 may include the interfaces 108*a–c* to connect to the busses 106*a–c*. The block 144 may include the interface 118 to connect to the bus 116.

The block 142 may be implemented as a memory block. In one embodiment, the memory block 142 may be a double data rate (DDR) memory array. In other embodiments, the memory block 142 may be configured as a random access memory (RAM), a read-only memory (ROM), or the like. In still another embodiment (not shown), the memory block 142 may be disposed within the block 144.

The block 144 may be implemented as a multiport cache with an integrated memory controller, also referred to as a multiport cache-memory controller block. The multiport cache-memory controller block 144 generally comprises the line buffer blocks 120*a–c*, the arbiter block 122, the controller block 124, the cache memory block 126, the interface configuration block 130 and a circuit or block 150. The block 150 may be implemented as a memory controller block. In one embodiment, the block 150 may be implemented as a DDR memory controller block.

The addition of the DDR memory controller block 150 generally provides a further level of integration by including a high performance DDR SDRAM memory subsystem. By including the cache capability of the controller block 124 and the cache memory block 126 as part of a multiported DDR memory subsystem, potential cache incoherency problems due to "write-behind" situations may be avoided while at the same time generally improving a latency the processors 102*a–c* would otherwise see. The integrated DDR memory controller block 150 generally supports data widths of 32-bits or 64-bits, along with a single 32-bit AHB-Lite width for control/status information. Other widths may be implemented to meet the criteria of a particular application. The DDR memory controller block 150 may be configured from the interface configuration block 130. Further details for the DDR memory controller block 150 and the DDR memory block 142 may be found in the related application Ser. No. 10/325,383 entitled, "AMBA Modular Memory Controller".

Figure 3:
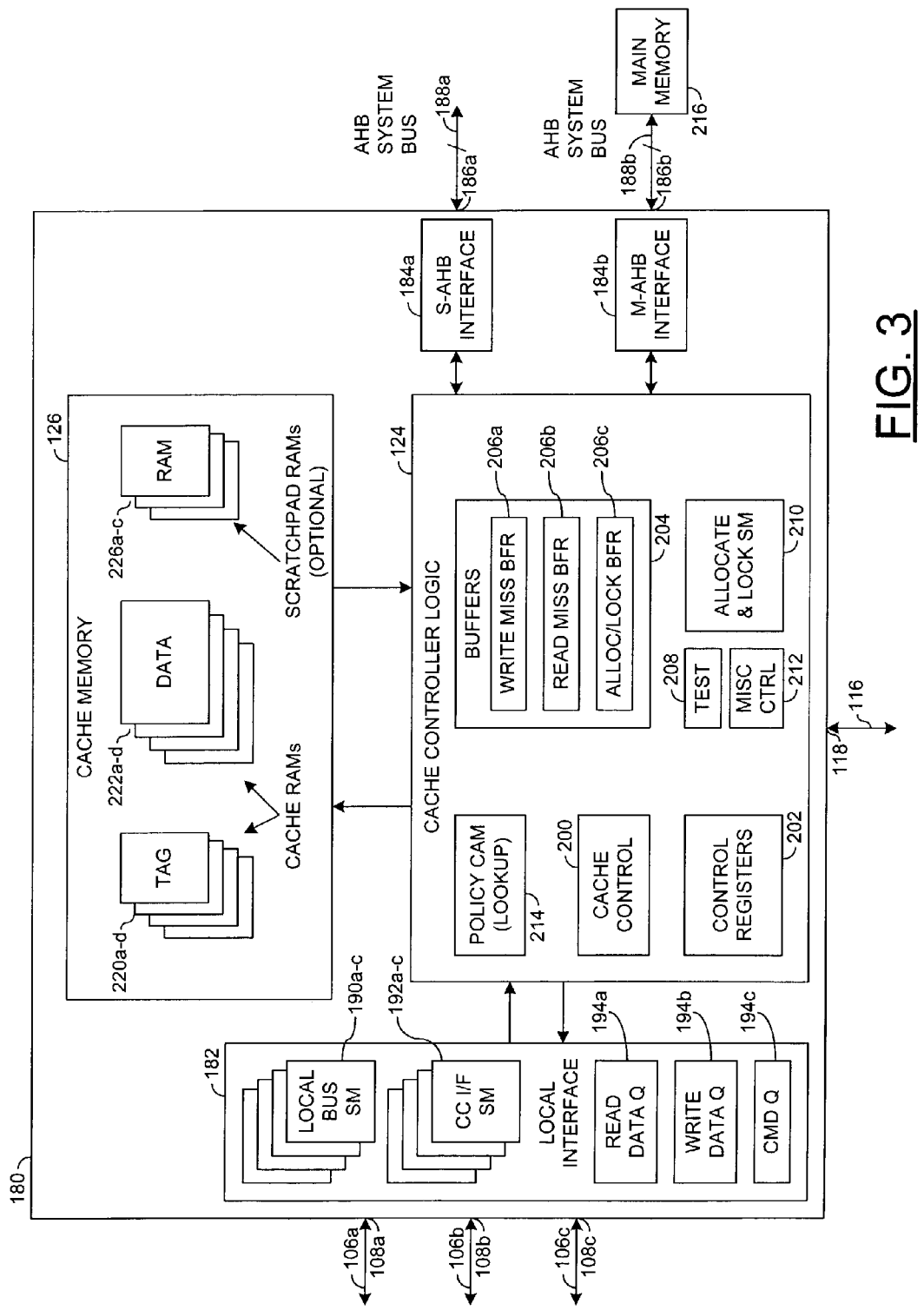
FIG. 3 is a block diagram of an example implementation of a multiport cache circuit.

Referring to FIG. 3, a block diagram of an example implementation of a multiport cache circuit 180 is shown. The multiport cache circuit 184 generally comprises a local interface circuit or block 182, the controller block 124, the cache memory block 126, and one or more line buffer blocks 184*a–b*. The interfaces 108*a–c* may be included to connect the multiport cache block 180 to the busses 106*a–c*. The bus 116 may be connected at the bus interface 118. Bus interfaces 186*a–b* may connect the multiport cache block 180 to multiple system busses 188*a–b*.

The block 182 may be implemented as a local interface block connectable to the busses 106*a–c*. The local interface block 182 generally comprises one or more bus interface sub-modules or blocks 190*a–c*, one or more cache control interface sub-modules or blocks 192*a–c*, and a plurality of queues 194*a–c*. The local interface block 182 may convey transaction requests received on the busses 106*a–c* to the controller block 124. The queues 194*a–c* may buffer transaction requests while the cache controller block 124 is servicing a particular transaction request.

The controller block 124 generally comprises a cache control circuit or block 200, a control registers circuit or block 202, a buffer circuit or block 204 having multiple line buffers 206*a–c*, a test circuit or block 208, an allocate-and-lock circuit or block 210, a miscellaneous control circuit or block 212 and a policy content addressable memory (CAM) circuit or block 214. The policy CAM block 214 may also be referred to as a lookup circuit or block. The policy CAM block 214 may be implemented as a ternary CAM. The cache memory block 126 generally comprises multiple tag random access memory (RAM) circuits or block 220*a–d*, multiple data RAM circuits or blocks 222*a–d* and multiple optional scratchpad RAM circuits or blocks 226*a–c*.

The line buffer block 184*a* may be referred to as a system bus interface block connectable to the system level AHB bus 188*a*. The line buffer block 184*b* may be referred to a maintenance bus interface block connectable to the maintenance AHB bus 188*b*. The system and maintenance interface blocks 184*a–b* may be the interfaces to lower levels of a memory hierarchy in which the multiport cache block 180 resides. The system and maintenance buses 188*a–b* are generally split between maintenance and system bus functions with an expectation that within a system, the maintenance bus 188*b* would generally be a slower, narrower and more global in scope than the system bus 188a. The system bus 188a generally establishes a much higher performance interconnect to a main memory 216. The separate buses 188a–b may also allow simultaneous operations to occur for concurrent transaction requests.

The local interface block 182 generally attaches directly to the bus interfaces 108a–c for communicating with the processors 102a–c (FIG. 1). The local interface circuit 182 may be configured to receive transaction requests for a main memory 216 accessible via one of the busses 188a–b (e.g., system bus 188b). The local interface circuit 182 generally decodes an address of the transaction request to decide if the request addresses the control registers block 202 or the main memory 216. Protocol translation between the bus protocol supported by the busses 106a–c and the internal signaling protocol may be performed by the block 182. Error and exception response handling and decode for illegal transaction requests may also be handled by the local interface block 182. Any other dependency processing for a particular bus type among the busses 106a–c may implemented in the local interface block 182.

The control registers block 202 generally contains the actual control and status registers for the multiport cache block 180. The control registers block 202 may include registers (e.g., fields) for the policy CAM block 214 as described below. The control registers block 202 may also decode read and write type transaction requests to the registers from the local bus interface block 182.

The buffer block 204 generally includes the Write Miss Buffer 206a, the Read Miss Buffer 206b and the Allocate/Lock Buffer 206c. The buffers 206a–c may be a cache line in width and may be used for temporary line storage during a particular operation or state in a transaction request. As an example, the Write Miss Buffer 206a may be used to store data coming back from the main memory 216 via bus 188b after a write miss has occurred and a write allocation has been initiated. The Write Miss Buffer 206a may hold data until the line of data may be written into a cache data RAM block 222a–d and the corresponding tag RAM block 220a–d is updated.

The cache RAM blocks generally comprise multiple monolithic RAMs for the cache data RAM blocks 222a–d and the tag RAM blocks 220a–d. The data RAM blocks 222a–d and the tag RAM block 220a–d set memories may be implemented with standard 6-transistor static RAM cell based memory compilers using single port synchronous configurations. Custom cache data/set memories may be avoided so the same memory compiler technology, as is used in the rest of the system, may be used.

The data RAM blocks 222a–d and tag RAM blocks 220a–d may be organized as an N-way (e.g., 4-way) set associative arrangement with set size of 32 KB. The 4-way set and 32 KB set size generally provide a total cache size of 128 KB. Larger RAMs or more sets may be implemented to change the associativity and/or total cache size. The data RAM blocks 222a–d may also be organized as a full line wide to enable high bandwidth reads/writes from/into the cache RAMs. The cache line width may be 256 or 512 bits. Other cache line widths may be implemented to meet the criteria of a particular application.

The scratchpad RAM blocks 226a–c generally comprise large blocks of RAMs that effectively function as a separate set having a very large line size. The scratchpad RAM blocks 226a–c may be variable in size but would typically be 8 KB to 32 KB. Other sizes may be implemented to meet the criteria of a particular application. The cache architecture of FIG. 4 generally shows the scratchpad RAM blocks 226a–c generally function in a cache pipeline in the same way as the data RAM blocks 222a–d.

The control block 200 generally interfaces between the local interface block 182 and the line buffer blocks 184a–b by handling cacheable transition requests into the cache tag blocks 220a–d and the data RAM blocks 222a–d. The control block 200 may first probe the policy CAM block 214 to determine the policy bits to be used for the received transaction. A performance enhancement of the present invention may include a substantially simultaneous lookup into all of tags in the cache tags RAM blocks 220a–d to determine if the associated cached data may be resident in the data RAM blocks 222a–d. A non-cacheable request may be passed onto either the line buffer block 184a or the line buffer block 184b as appropriate and properly sequenced for read or write until the transaction request may be completed. Upon receipt of a cacheable request, the cache controller block 200 may probe the tag RAM blocks 220a–d to see if the data may be resident in the data RAM blocks 222a–d. The cached data may be returned upon a cache hit, or the read transaction request may be passed to the appropriate line buffer block 184a or 184b upon a cache miss. In either case of a cache hit or a cache miss, the transaction request may be properly sequenced according to the policy bits active for a memory region identified by the transaction request.

Figure 4:
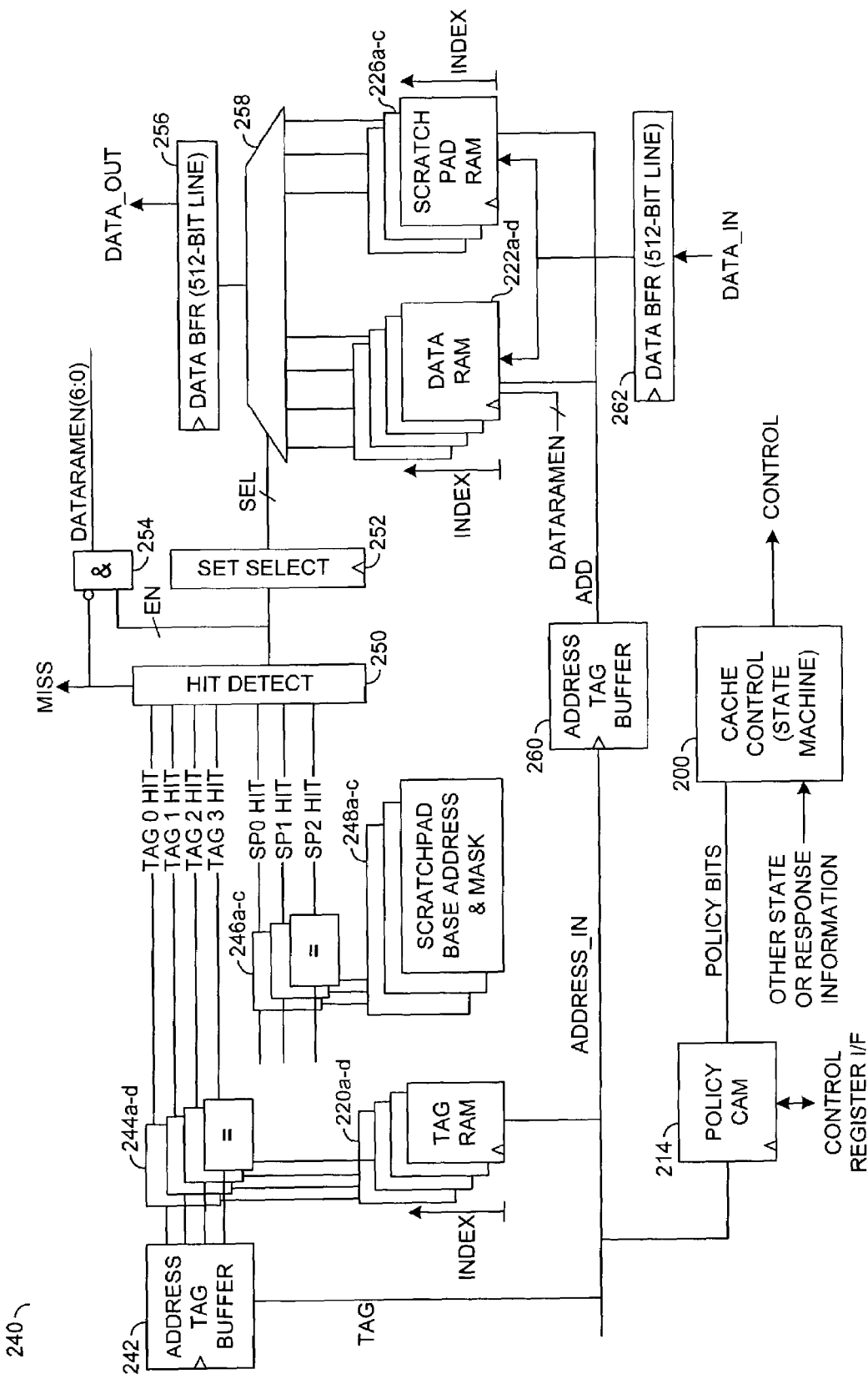
FIG. 4 is a block diagram of a logical representation of a 4-way set associative cache.

Referring to FIG. 4, a block diagram of a logical representation of a 4-way set associative cache 240 is shown. The 4-way set associate cache 240 generally comprises the cache control block 200, the policy CAM block 214, the tag RAM blocks 220a–d, the data RAM blocks 222a–d, the scratchpad RAM blocks 226a–c, an first address tag buffer or block 242, multiple tag comparison blocks 244a–d, multiple scratchpad comparison blocks 246a–c, multiple scratchpad base address and mask blocks 248a–c, a hit detect block 250, a set select block 252, a logical operation block 254, an output data buffer block 256, a multiplexer 258, a second address tag buffer block 260 and an input data buffer block 262. An address signal (e.g., ADDRESS_IN) may be received by the policy CAM block 214, the tag RAM blocks 220a–d and the second tag buffer block 260. A sub-signal (e.g., TAG) from the signal ADDRESS_IN may be received by the first address tag buffer block 242. An input data signal (e.g., DATA_IN) may be buffered by the input data buffer block 262. An output data signal (e.g., DATA_OUT) may be presented by the output data buffer block 256.

The policy CAM block 214 may receive information from the control registers block 202 (FIG. 3). The policy CAM block 214 may generate a signal (e.g., POLICY_BITS) from a particular policy identified by the signal ADDRESS_IN. The cache control block 200 may receive the signal POLICY_BITS and other state or response information. The cache control block 200 may generate control signals (e.g., CONTROL) based upon the transaction request, the signal POLICY_BITS and the other state and response information.

Each comparison block 244a–d may generate a signal (e.g., TAG_x_HIT, where x is an integer from 0 to d). Each comparison block 246a–c may generate a signal (e.g., SPy_HIT, where y is an integer from 0 to c). The hit detection block 250 may generate a signal (e.g., MISS) if the signals TAG_x_HIT and the signals SPy_HIT indicate a cache miss. The hit detection block 250 may generate an enable signal (e.g., EN) if the signals TAG_x_HIT and the signals SPy_HIT indicate a cache hit.

The logical block 254 may generate a signal (e.g., DATARAMEN[6:0]) that may enable a particular data RAM block 222a–d holding the cache data triggering the hit. The set select block 252 may generate a signal (e.g., SEL) addressing the particular data RAM block 222a–d and scratchpad RAM block 226a–c holding the cache data triggering the hit. The multiplexer 258 may route the cache data causing the hit to the output data buffer block 256 based upon the signal SEL.

The second address tag buffer block 260 may generate and address signal (e.g., ADD). The address signal ADD may identify where within the data RAM blocks 222a–d and the scratchpad PAM blocks 226a–c incoming data held in the input data buffer block 262 may be stored.

The cache policy block 214 is generally implemented using a ternary CAM architecture that may enable quick hardware lookups of incoming addresses. Upon finding one or more matches, the policy CAM block 214 presents the corresponding cache policy bits active for the current transaction request. The policy CAM block 214 may store all or the active cache policy entries including fields for the cache policy addresses, the cache policy address masks, and the cache policy bits (e.g., bits within the signal POLICY_BITS)

As a point of reference, conventional binary CAM entries compare incoming logical zero and logical one bits exactly during a lookup phase for a match to occur. The ternary CAM generally allow matching operations on a bit-by-bit basis during the lookup to be 0, 1, or X (e.g., don't care). Since the matching CAM entry is an address, the ternary CAM function effectively allows a programmable match width that allows policy bits to be active over a variable page size. Variable page sizes may be useful in implementing virtual address machines. The policy CAM block 214 may also be implemented with fixed page sizes that a conventional CAM would implement. However, a useful implementation using conventional CAMs would include too many entries to be practical. Because the range of addresses for each entry of a ternary CAM may be variable, the ternary CAM function generally works well in the lookup operation of the policy CAM block 214.

The policy CAM block 214 may be initially written with cache policy entries including the cache policy addresses, the cache policy address masks, and the cache policy bits at startup or any time thereafter. The policy CAM block 214 may be loaded through an interface to the control registers block 202 using a same mechanism as other internal status and control registers. Therefore, the various fields within the policy CAM block 214 may appear the same as any other program addressable location to software or code.

During the lookup phase, the ternary CAM performs a substantially simultaneous search of all entries for a longest prefix match. The prefix may be the upper bits of an address received in a transaction request masked with an appropriate mask programmed in the ternary CAM. The entry which has the longest sequence of matching bits according to the incoming match field, the match field for each entry, and the corresponding match field mask for each entry may be generated as the correct policy. Upon a match, the policy bits from the active policy may be returned and passed onto the cache control block 200 to be used throughout the remaining duration of that transaction request.

Referring to FIG. 5, a Table II for an example of a policy CAM operation is shown. The 2nd, 3rd and 4th columns from the left in the table may illustrate the actual ternary CAM fields. The 5th column from the left in the table generally shows an effective address range over which a cache policies may be in effect. The 6th column from the left in the table generally shows the cache policies that may be in effect for a particular address range. The function of the ternary CAM may be to resolve the incoming address bit pattern against the CAM entries using the CAM masks to generate the policy bits for the longest matching (e.g., in case of overlap of address region) CAM entry.

Referring to FIGS. 6a–c, a Table III summarizing a peripheral register set is shown. The peripheral register set generally consists of multiple registers. The registers may be accessed via a register interface of the cache control block 200. Table III summarizes the registers that may be implemented. The Rd/Wr column generally indicates whether the register may be written and read or if the register may be read-only. In some cases, the register may contain bits that are a mixture of read/write and read-only. The cache policy page address registers, the cache policy page address mask registers and the cache policy registers may be relevant in determining a particular policy for a particular transaction request or command. During read operations, the reserved bits in the registers may be treated as unknown. During writes operations, the reserved bits may be written as logical zeros.

The Cache Policy Page Address registers are generally used to set the page address which, when combined with the corresponding Cache Policy Page Address Mask and Cache Policy registers, defines the cache policy for that page. There may be 32 registers that make up the Cache Policy Page Address registers, one for each address region. Other numbers of Cache Policy Page Address registers may be implemented to meet a design criteria for a particular application.

Referring to FIG. 7, a diagram of a Cache Policy Page Address register bit definition is shown. A policy address value (e.g., PA) may have a reset value of zero. Access to the Cache Policy Page Address registers may be read and write. When combined with the information stored in the associated Cache Policy Page Address Mask register, the combination may be the page address for the particular active policy.

Referring to FIG. 8, a diagram of a Cache Policy Page Mask register bit definition is shown. The Cache Policy Page Address registers may used to set the page address which, when combined with the corresponding Cache Policy Page Mask and Cache Policy registers, defines the cache policy for that page. The Cache Policy Page Mask registers are used to determine a size (e.g., PM) of the corresponding Cache Policy Page. Each bit position within the Cache Policy Page Mask registers may determine which corresponding bits in a corresponding Cache Policy Page Register may be don't care bits. There may be 32 registers which make up the Cache Policy Page Mask registers, one for each address region. Other numbers of Cache Policy Page Mask registers may be implemented to meet a design criteria of a particular application. The Cache Policy Page Mask values may have a reset value of zero. Access to the Cache Policy Page Mask registers may be read and write.

Referring to FIG. 9, a diagram of a Cache Policy register bit definition is shown. The Cache Policy registers generally determine the cache policies for the memory region defined by the Cache Policy Page registers and the Cache Policy Mask registers. There may be 32 Cache Policy registers. Other numbers of Cache Policy registers may be implemented to meet a criteria of a particular application. The values within the Cache Policy register (e.g., C, B, WA, WB and MWA), the Cache Policy Page Address registers PA and the Cache Policy Page Mask registers PM together generally define the policies for the various address regions or ranges.

The variable C may be implemented as a one-bit variable determining either a cacheable state (e.g., a logical one state or condition) or a non-cacheable state (e.g., a logical zero state or condition) for a respective policy of an address region. The variable C may have a reset value of zero (e.g., cacheable) Access to the variable C may be read and write.

The variable B may be implemented as a one-bit variable determining either a bufferable state (e.g., a logical one state or condition) or a non-bufferable state (e.g., a logical zero state or condition) for a respective policy of an address region. The variable B may have a reset value of zero (e.g., non-bufferable). Access to the variable B may be read and write.

The variable WA may be implemented as a one-bit variable determining either a write-allocate state (e.g., a logical one state or condition) or a no-write-allocate state (e.g., a logical zero state or condition) for a respective policy of an address region. The variable WA may have a reset value of zero (e.g., no-write-allocate). Access to the variable WA may be read and write.

The variable WB may be implemented as a one-bit variable determining either a write-back state (e.g., a logical one state or condition) or a write-thru state (e.g., a logical zero state or condition) for a respective policy of an address region. The variable WB may have a reset value of zero (e.g., write-thru). Access to the variable WB may be read and write.

The variable MWA may be implemented as a one-bit variable determining either a minimum write-allocate-on-burst state (e.g., a logical one state or condition) or a minimum write-allocate-on-any state (e.g., a logical zero state or condition) for a respective policy of an address region. The variable MWA may have a reset value of zero (e.g., minimum write-allocate-on-any). Access to the variable MWA may be read and write.

The MWA bit is generally used to determine a minimum request size for a write-allocate enable region that may trigger a write-allocate during a write miss. Requests smaller than the size, even if enabled for write-allocate, may not trigger a write-allocate to occur. Requests equal to or larger than the size, if enabled for write-allocate, may trigger a write-allocate operation to occur.

Several variations may be implemented in a design of the block and circuit without departing from the sprite of the present invention. For example, instead of using a monolithic ternary CAM for the address compare, mask and policy determination, a discrete implementation of registers, masks and comparators may be implemented. In another example, a number and type of cache policies that may be determined may extend beyond the above disclosed examples. Generally, any number of memory regions and cache policies may be implemented. Furthermore, the address size may be larger or smaller than that shown for the Cache Policy Address/Mask registers.

The present invention generally provides a user with an ability to program cache polices by memory region. The programmable cache policies may be useful in a variety of implementations such as the multiport cache controller block 104 and the multiport cache-memory controller block 144 with an integral DDR memory controller. The architecture of the inline cache may be independent of the type of processors 102a–c implemented. Large multi-way set arrangements may include options for 4, 8 or 16 sets. Multiple busses 106a–c may be accommodated. Arbitration among the busses 106a–c may include time division multiplex arbitration with lookahead and/or programmable slot assignment to guarantee minimum and/or maximum bandwidth allocated among the bus ports 120a–c. The AMBA 2.0 AHB-Lite configuration may be supported. A configuration port 130 may be included for programming control registers with user determined options. Parity protection may be implemented with an option for error correction code support. Operations may be fully synchronous with a fully static design. Flexible AHB bus clocking generally allows synchronous bu integer related clock frequencies. The line size may be user configurable (e.g., 256-bit or 512-bit) Cache coherency checks may be done as part of an AHB line cache. The arbiter block 122 generally supports the AHB HLOCK operation. Cache policies may be programmed for write-back versus write-through and write-allocate.

The ternary CAM entry with masks generally determines the memory address regions to which policies may be applied. Corresponding matched CAM entries may determine cache policy bits to be used for the particular transaction request. Multiple (e.g., 32) separate address regions may be implemented, each with a unique policy. Each policy may establish a write-allocate versus no-write-allocate condition, a write-back versus write-thru condition, a cacheable versus non-cacheable condition, a bufferable versus non-bufferable condition, a minimum write-allocate size (e.g., burst/no-burst) and other conditions. A size of each region may be independent of other regions since each ternary CAM entry generally has a separate address mask.

The monolithic ternary CAM implementation may be suitable for high performance designs. For example, the ternary CAM may provide a cache function with multiple heterogeneous processors or systems interconnected with bus protocols that don't support signals for cache policy determination. Therefore, a cache policy may be generated without being signaled as part of a transaction request generated by the processors and/or masters.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of operating a circuit, comprising the steps of:
    (A) entering a first address of a first transaction request received by said circuit on a particular bus of a plurality of first busses into a ternary content-addressable-memory lookup operation to determine a particular policy from a plurality of policies;
    (B) generating a second transaction request on a second bus for use by an external memory external to said circuit in response to said first transaction request having a first protection signal in a non-cacheable state, wherein said second transaction is generated based upon (i) said first transaction request, (ii) said particular policy and (iii) said first protection signal; and
    (C) searching a plurality of address tags for cache data cached within said circuit for at least one match with said first transaction request in response to said first protection signal having a cacheable state.

2. The method according to claim 1, wherein step (A) further comprises the sub-step of:
   masking said first address of said first transaction request with a mask field prior to searching each of said policies.

3. The method according to claim 2, wherein step (A) further comprises the sub-step of:
   determining said particular policy by prioritizing said matches by a number of bits of said address tags matching said first address of said first transaction request.

4. The method according to claim 1, further comprising the step of:
   generating a second protection signal for said second transaction request based on said particular policy, said second protection signal having one of (i) a caching state and (ii) a non-caching state for data of said second transaction request.

5. The method according to claim 1, further comprising the step of:
   generating a buffer signal for said second transaction request based on said particular policy, said buffer signal having one of (i) a buffering state and (ii) non-buffering state for data of said second transaction request.

6. The method according to claim 1, further comprising the step of:
   transferring write data of said first transaction request to said second transaction request in response to said particular policy having a write-thru condition.

7. The method according to claim 1, further comprising the step of:
   caching write data of said first transaction request in said circuit in response to said particular policy having a write-allocate condition.

8. The method according to claim 7, wherein caching said write data is in further response to said particular policy having a burst condition and said first transaction request being a burst write request.

9. The method according to claim 1, wherein each of said policies is associated with an address range.

10. The method according to claim 9, wherein at least two of said address ranges overlap.

11. The method according to claim 10, wherein step (A) comprises the sub-step of:
    determining said particular policy based on a particular one of said address ranges that overlap having a greatest number of bits matching said first address of said first transaction request.

12. A circuit comprising:
    a cache block configured to store a plurality of address tags and cache data; and
    a control block configured to (i) enter a first address of a first transaction request received on a particular bus of a plurality of first busses into a ternary content-addressable-memory lookup operation to determine a particular policy of a plurality of policies, (ii) generate a second transaction request on a second bus for use by an external memory external to said circuit in response to said first transaction request having a first protection signal in a non-cacheable state, wherein said second transaction request is generated based upon (a) said first transaction request, (b) said particular policy and (c) said first protection signal and (iii) search said address tags for at least one match with said first transaction request in response to said first protection signal having a cacheable state.

13. The circuit according to claim 12, wherein said control block comprises:
    a ternary content addressable memory configured to store said policies under software control.

14. The circuit according to claim 12, wherein each of said policies is allocated to a range of addresses.

15. The circuit according to claim 14, wherein at least two of said range of addresses have different sizes.

16. The circuit according to claim 12, wherein said cache block comprises:
    a first memory configured to store said cache data.

17. The circuit according to claim 16, wherein said cache block further comprises:
    a second memory having a line width greater than said first memory and configured to store an associative set of said cache data.

18. The circuit according to claim 12, further comprising:
    an interface block configured to communicate at a plurality of bus interfaces each capable of receiving said first transaction request.

19. The circuit according to claim 12, further comprising a memory controller disposed between said controller and said external memory.

20. The circuit according to claim 12, further comprising an arbiter configured to arbitrate among said first busses for access to said external memory.

21. An apparatus comprising:
    means for entering a first address of a first transaction request received by a circuit on a particular bus of a plurality of first busses into a ternary content-addressable-memory lookup operation to determine a particular policy from a plurality of policies;
    means for generating a second transaction request on a second bus for use by an external memory external to said circuit in response to said first transaction request having a first protection signal in a non-cacheable state, wherein said second transaction is generated based upon (i) said first transaction request, (ii) said particular policy and (iii) said first protection signal; and
    means for searching a plurality of address tags for cache data cached within said circuit for at least one match with said first transaction request in response to said first protection signal having a cacheable state.

* * * * *